F. W. MINOR.
REPRODUCER.
APPLICATION FILED OCT. 4, 1921.
Reissued Jan. 17, 1922. 15,269.
FIG. 1.
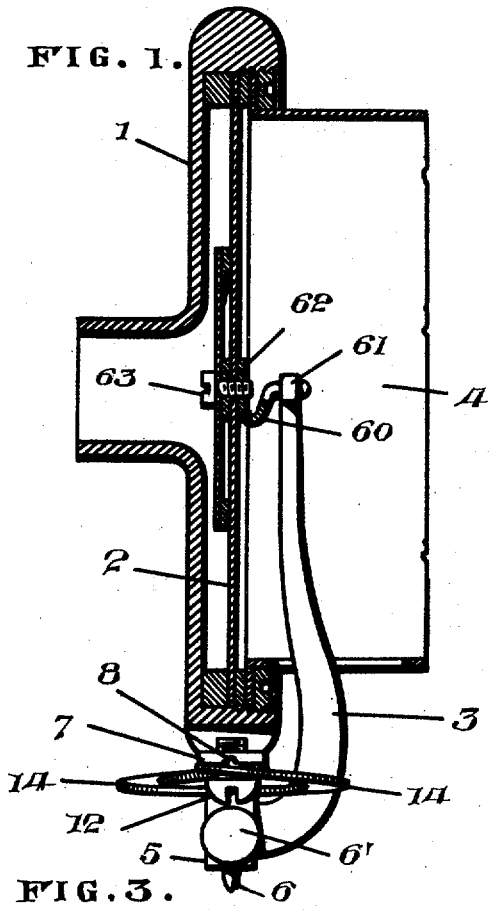
FIG. 2.
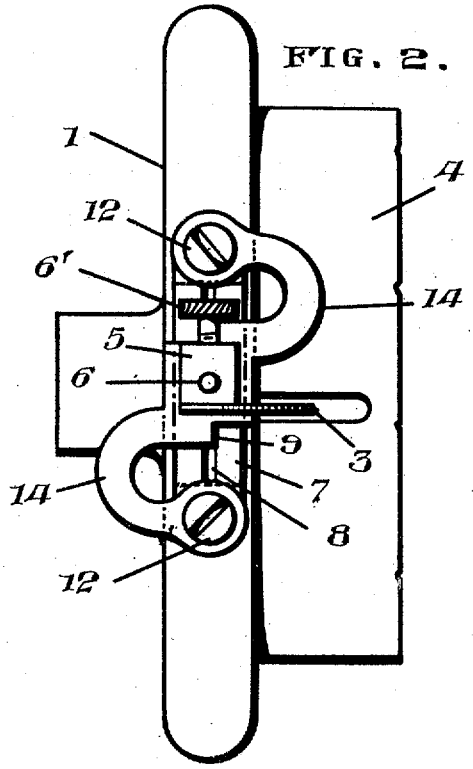
FIG. 3.
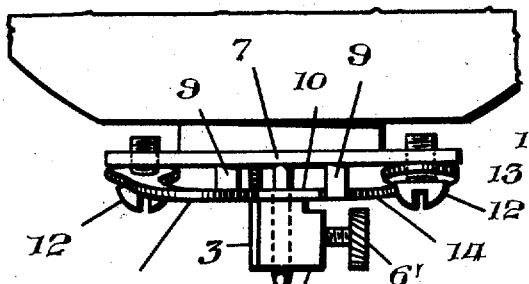
FIG.
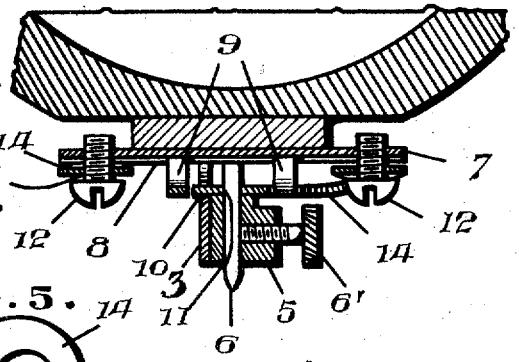
FIG. 5.
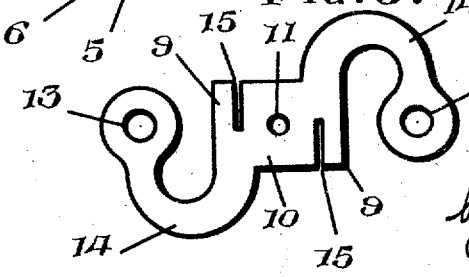
INVENTOR:
FRANK W. MINOR,
by Monroe E. Miller
ATTORNEY.

UNITED STATES PATENT OFFICE.

FRANK W. MINOR, OF RICHMOND, VIRGINIA.

REPRODUCER.

15,269. Specification of Reissued Letters Patent. Reissued Jan. 17, 1922.

Original No. 1,375,407, dated April 19, 1921, Serial No. 385,996, filed June 2, 1920. Application for reissue filed October 4, 1921. Serial No. 505,398.

*To all whom it may concern:*

Be it known that I, FRANK W. MINOR, a citizen of the United States, and a resident of Richmond, in the county of Henrico and State of Virginia, have invented certain new and useful Improvements in Reproducers, of which the following is a specification.

My present invention relates to reproducers for phonographs and the like and has special reference to the means for supporting the stylus arm, the object of the invention being to provide a simple and cheap support which may be readily applied to the reproducer, will facilitate repairs, and will permit the stylus and stylus arm to vibrate easily while, at the same time, being susceptible of ready adjustment to compensate for wear and impart a desired tension to the stylus and its arm.

In the accompanying drawings:—

Figure 1 is a longitudinal section through a reproducer, having its stylus arm supported in accordance with my invention.

Fig. 2 is a bottom plan view of the same.

Fig. 3 is a front elevation of the stylus arm support.

Fig. 4 is a section through the support taken at a right angle to Fig. 1; and

Fig. 5 is a detail plan view of the blank from which the tension bridge or flex plate is made.

The reproducer shell 1 is of the usual form and contains a diaphragm 2 to which the inner end of a stylus arm 3 is centrally attached. In Figs. 1 and 2, I have shown a portion of a resonator 4, employed by me to amplify and improve the resonance of the sounds given out by the diaphragm.

As shown clearly in Fig. 1 the stylus arm passes through a slot provided therefor in the side wall of the resonator and is of an ogee form to clear the reproducer shell, the outer end of the arm being secured to one side of the socket 5 thereby eliminating the lugs of special form which are now generally employed in order to secure the arm at the axis or longitudinal center of the socket. The socket 5 receives the needle 6 which is secured therein by a set screw 6′, as will be readily understood, so that the needle may be set at any point of its length to produce a modified or loud sound effect. The inner end of the stylus arm is not secured directly to the diaphragm but is connected therewith through a small link 60 of substantially gooseneck form which tends to overcome the rebound from the sound vibrations, the outer extremity of the link being fitted in an eye 61 at the end of the stylus arm and base 62 of the link bearing flat sided against the diaphragm while the intermediate portion or shank of the link is curved laterally so that the securing screw 63 may be inserted without touching the shank.

The reproducer shell 1 is provided with a base plate 7 which may be fixed thereto in any preferred manner, and is provided in its exposed face with a medially located longitudinal groove 8 in which the fulcrum posts 9 of the tension bridge 10 seat for rocking movement. The tension bridge extends directly across the base end of the socket 5, as shown in Figs. 3 and 4, and is formed with a central opening 11, through which the needle or stylus 6 passes, the needle bearing, in its extreme inner position, against the base plate 7, as shown in Figs. 3 and 4. It will be readily seen that the bridge will tend to oscillate with the socket and the needle as the needle follows the undulations of the record. The tension bridge is held to the base 7, by screws 12 fitted loosely through openings 13 in the ends of the bridge and engaging internally threaded openings in the ends of the base plate. Obviously by turning the screws home to a greater or less extent, the ends of the fulcrum posts 9 will be caused to bind more or less firmly in the grooves 8, and the resistance offered to the oscillation of the stylus will be controlled.

The tension bridge or flex plate may be economically and expeditiously stamped from a sheet metal blank illustrated in Fig. 5. Said blank comprises a central oblong body from the opposite longer sides of which at the opposite ends thereof, curved arms 14 extend, said arms returning to the longitudinal axis of the body and having the openings 13 in their ends. The openings 13 are in alinement with the central opening 11, as shown clearly in Fig. 5, so that the needle 6 and the adjusting and retaining screws 12 will be in alinement. In each side edge of the body portion of the bridge, at a point opposite the corresponding arm 14, I form an incision 15, the portion of the blank between each incision and the adjacent end of the body of the blank being struck up to form a fulcrum post 9, as will be readily understood.

From the foregoing description, taken in connection with the accompanying drawings, it will be seen that I have provided a very simple and inexpensive device by the use of which the stylus arm with the needle or stylus will be firmly supported so that it can not get out of place but will be permitted to vibrate with the necessary freedom. The socket is provided with a bore opening through its opposite ends so that the stylus or needle may extend entirely therethrough or be adjusted in the direction of its length, a greater volume of sound being produced when the point of the needle is partly withdrawn than when it projects its full length.

The form of the stylus arm shown in the accompanying drawings permits the full force of its vibrations to be transmitted to the diaphragm and care is to be observed in making the stylus arm that the curved portion be not made too short and abrupt.

It will be noted, by reference to the drawing, that when the tensioning and retaining screws or members 12 are tightened, the terminals of the resilient arms or portions 14 will be sprung toward the base plate or abutment 7, and, in practice, said screws are tightened sufficiently to bring the terminals of said arms against said base or abutment, or adjusted to suit the requirements, as shown in the drawing. Owing to the fact that the terminals of the reverse arms or portions 14 extend laterally or transversely in opposite directions beyond the ends of the longitudinal body portion of the tension bridge of flex plate, such terminals of the arms will assume reverse inclined positions, when the screws 12 are tightened, as seen in the drawing, thereby creating somewhat of a twisting tension between the opposite terminals of the bridge or plate 10. The bridge or plate is thus bowed to press the fulcrum posts 9 tightly in the groove 8 of the base or abutment, for the transverse edgewise vibration of said bridge. The bridge is thus tensioned in an effective manner, and an additional advantage is obtained. The terminals of the arms 14 in assuming opposite inclined positions will enable the bridge to be adjusted in order to determine the normal or neutral position of the stylus arm or bar 3 and diaphragm 2. Thus, by tightening one screw, the corresponding arm 14 is brought under greater tension, tending to swing the bridge in one direction, whereas when the other screw is tightened, the other arm is tensioned so as to create a tendency to swing the bridge in the opposite direction. Referring to Fig. 1, if the nearest screw is tightened, this creates a tendency to swing the bridge toward the right, whereas if the opposite screw is tightened, there is a tendency to swing the bridge toward the left. The tightening of the screws, therefore, not only springs the arms 14 toward the base or abutment away from the plane of the body portion of the bridge or plate 10, but also applies corresponding tension to the reverse arms 14 to properly position the bridge, arm or bar 3 and diaphragm. In some cases, the terminals of the arms 14 may even be clamped tightly between the base or abutment and heads of the screws. By having the opposite laterally extending terminals of the bridge and corresponding portions of the base or abutment arranged at acute angles with one another transversely in reverse directions, during the tightening of the screws, the bridge can be tensioned transversely in opposite direction for adjusting it and defining the normal passive position of the bar or arm 3 and diaphragm 2.

Various modifications may be made without departing from the spirit and scope of the appended claims. As to the connection of the inner end of the stylus arm to the diaphragm it will readily be understood that if desired the link 60 may be made as an integral part of the stylus arm rather than separate and secured in the eye 61 as shown in the drawings.

Although the improvements are especially useful in sound reproducers, the same may also be used to advantage in sound recorders and other acoustic devices for the transmission of sound waves.

Having thus fully described my invention, what I claim as new and desire to secure by Letters Patent of the United States, is—

1. The combination with a reproducer shell, and a stylus, of a base plate on the reproducer shell having projecting ends, a tension bridge arranged to oscillate with the stylus having a body portion and resilient arms at the ends of said body portion projecting laterally and extending back into the longitudial line of the body portion beyond the ends thereof, means for fulcruming the bridge upon the base plate, adjusting screws fitted loosely through said arms having a threaded engagement with the ends of base plate, and a socket for the stylus secured to the central portion of the tension bridge.

2. A tension bridge for sound reproducers comprising a substantially oblong body having a central opening therethrough, curved arms extending from opposite sides of the body at the opposite ends of the same and having their ends provided with openings alined with the central opening through the body, and fulcrum posts bent from the end portions of the body at the sides opposite the respective arms.

3. A blank for a sound reproducer tension plate consisting of a rectangular sheet having an opening therethrough at its center, and being further provided with an incision in each side edge, the incisions being located adjacent opposite ends of the plate, and an arm projecting laterally from each side edge of the plate at the end thereof remote from the incision therein, the arm being doubled on itself in the plane of the plate and terminating in an eye in spaced relation to the adjacent end of the plate.

4. A sound wave transmitting bridge having a longitudinal fulcrum portion for the transverse oscillation of the bridge with respect to a base member, said bridge having resilient end portions terminating beyond the ends of said fulcrum portion in the longitudinal line thereof to be sprung toward or against said base member by securing means, and said end portions being arranged to assume reverse transverse inclined positions when sprung toward the base member.

5. A sound wave transmitting bridge having a longitudinal fulcrum portion between its ends projecting therefrom to engage a base member for the transverse edgewise vibration of said bridge about an axis lying in the base member, said bridge having resilient end portions terminating beyond the ends of said fulcrum portion in the longitudinal line thereof to be sprung toward or against said base member toward said axis by securing means, said end portions being arranged to assume reverse transverse inclined positions for cooperation with said securing means.

6. A sound wave transmitting bridge having a body portion with longitudinal fulcrum means between its ends for the transverse oscillation of said body portion with respect to a base member, said body portion having resilient arms extending laterally from the body portion and provided with terminals extending back to the longitudinal line of said fulcrum means beyond the ends of the body portion to be sprung toward or against said base member by securing means.

7. A sound wave transmitting bridge having a body portion with a longitudinal fulcrum portion for the transverse oscillation of the body portion with reference to a base member, and a resilient arm extending laterally from each edge of said body portion, said arms being located at the opposite ends of the body portion and having terminals extending back to the longitudinal line of said fulcrum portion beyond the corresponding ends of the body portion to be sprung toward or against said base member by securing means and to assume reverse transverse inclined positions.

8. A sound wave transmitting bridge having a body portion with a longitudinal fulcrum portion between its ends extending therefrom to engage a base member for the transverse edgewise vibration of said body portion about an axis lying in the base member, said body portion having resilient arms extending laterally therefrom and provided with terminals extending back to the longitudinal of said fulcrum portion beyond the ends of the body portion to be sprung toward or against said base member by securing means and to move toward said axis when sprung.

9. A sound wave transmitting bridge having a body portion with a longitudinal fulcrum portion between its ends extending therefrom to engage a base member for the transverse edgewise vibration of said body portion about an axis lying in the base member, and a resilient arm extending laterally from each edge of said body portion, said arms being located at the opposite ends of the body portion and having terminals extending back to the longitudinal line of said fulcrum portion beyond the corresponding ends of said body portion to be sprung toward or against said base member by securing means and to be moved toward said axis when sprung.

In testimony whereof, I hereunto affix my signature.

FRANK. W. MINOR.